March 11, 1952     G. F. RICHARDS     2,588,879
AUTOMATIC DOOR CONTROL SYSTEM
Filed Aug. 23, 1948     3 Sheets-Sheet 1
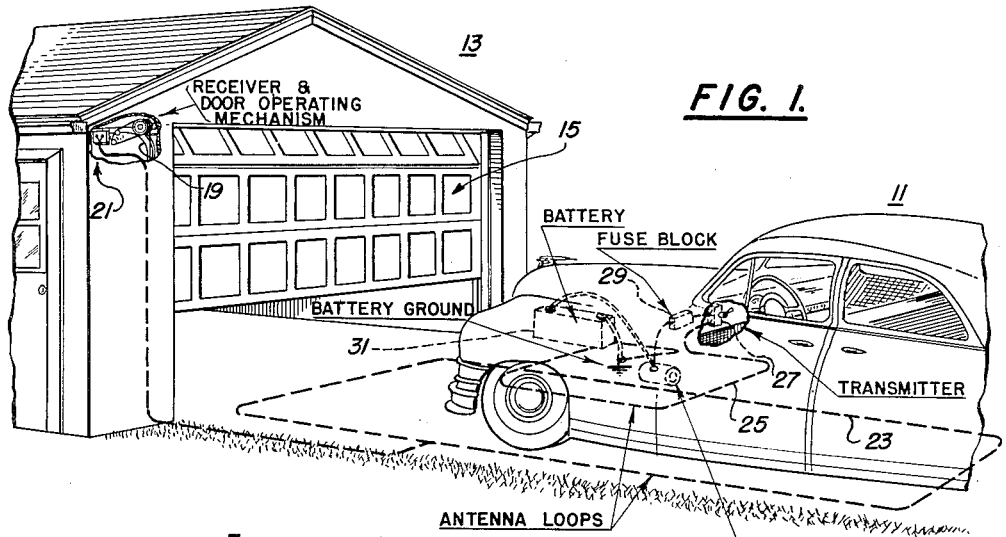
FIG. 1.
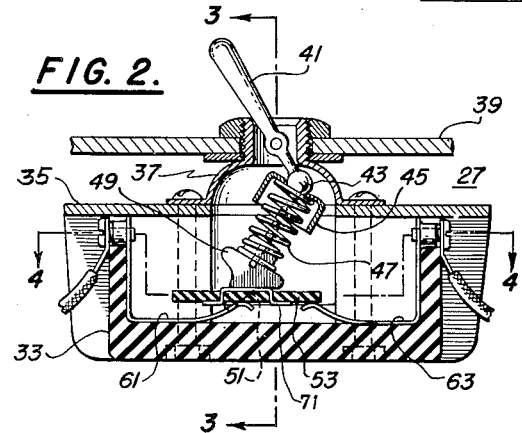
FIG. 2.
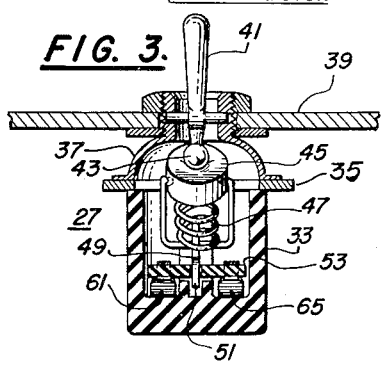
FIG. 3.
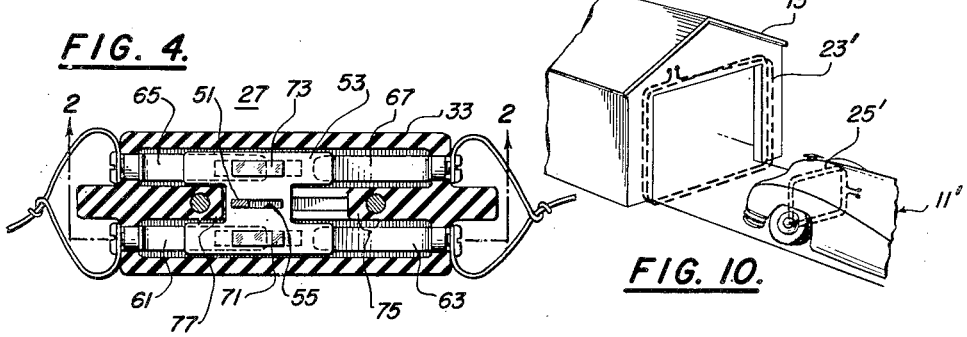
FIG. 4.
FIG. 10.
INVENTOR
GEORGE F. RICHARDS
BY
Thomas M. Ferrill, Jr.
ATTORNEY

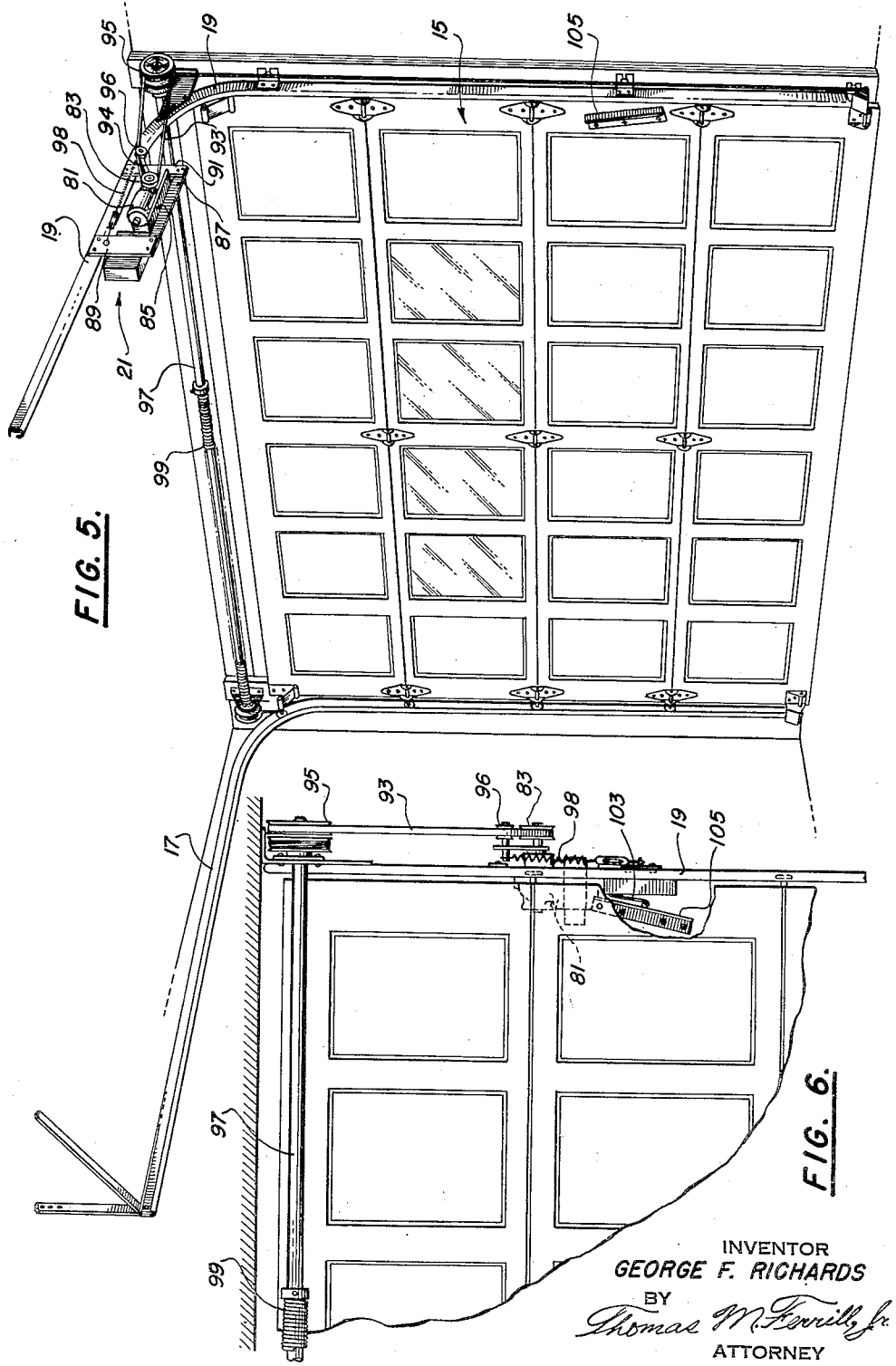

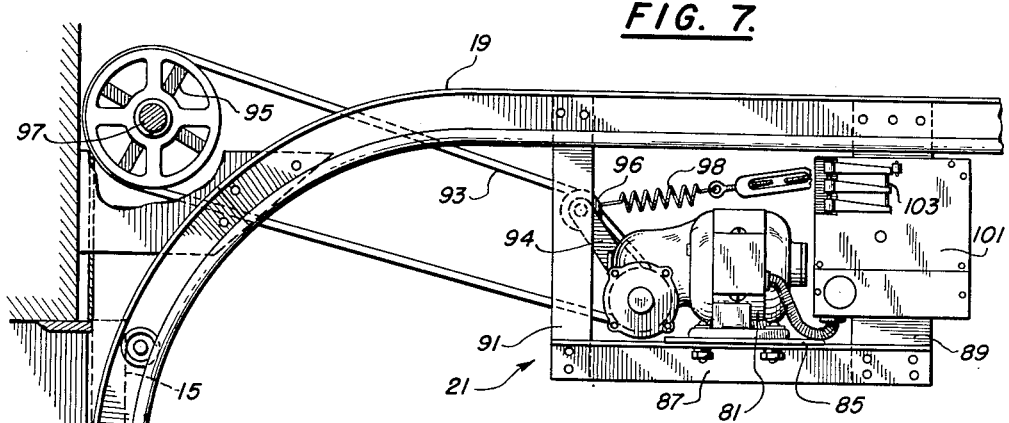
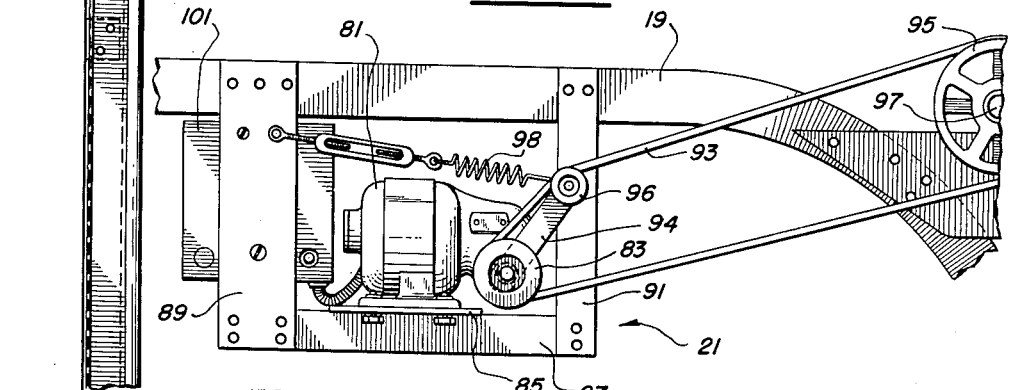
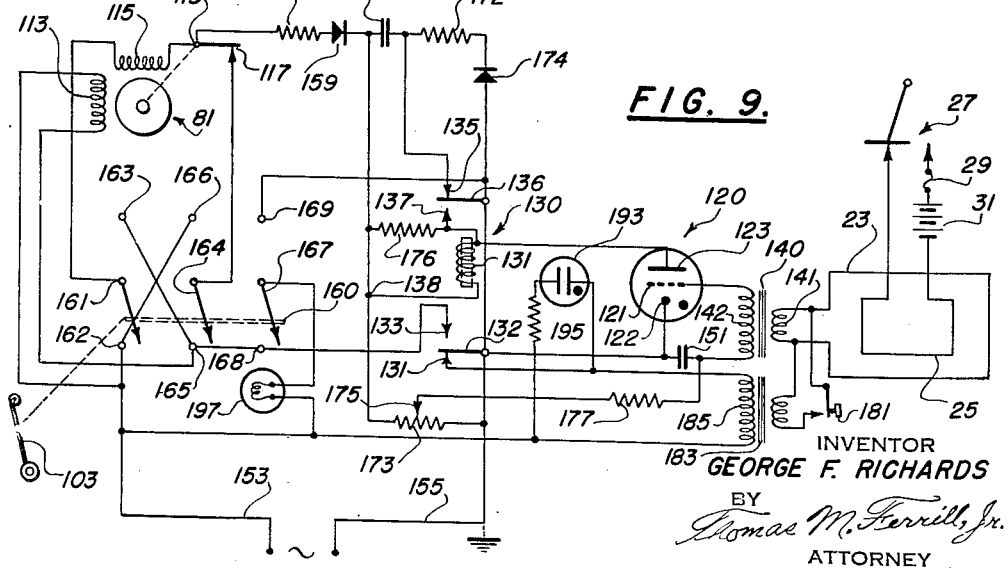

Patented Mar. 11, 1952

2,588,879

UNITED STATES PATENT OFFICE 2,588,879

AUTOMATIC DOOR CONTROL SYSTEM

George F. Richards, Garden City, N. Y., assignor to Teletronics Laboratory, Inc., Westbury, N. Y., a corporation of New York Application August 23, 1948, Serial No. 45,759

5 Claims. (Cl. 268—59)

The present invention relates to automatic control systems for remote or local signalling actuation of movable devices. It is particularly concerned with an improved mechanical operator suitable for actuating heavy doors such as sectional overhead garage doors, and especially with such an arrangement for control either from a nearby vehicle or from a local switch.

Automatic garage door operating equipment has heretofore been provided in various forms of installation in a garage and for attachment to any of a variety of types of garage doors. Such operating equipment has generally been characterized by bulky and cumbersome construction, usually involving massive motive and coupling units for attachment to the garage ceiling and/or walls, and requiring extensive services of skilled mechanics to install the equipment and secure proper alignment of the motive and coupling parts with the door to be operated. The great space requirements have been such as to preclude their use in numerous cases.

With the large size and separate suspension of the prior garage door operating systems, the initial costs and installation costs have been excessive, and maintenance requirements have been severe. Electric motors of the order of ¼ horsepower rating have been employed, even for operating the smallest overhead doors, however well counterbalanced.

Further disadvantages of prior door operator systems have included elaborate remote control signal transmitting arrangements for installation in the automobiles to be housed in the garage, and complex signal receiving arrangements for installation at or beneath the driveway, to permit the owner to signal the automatic operation of the door from within the automobile. Heretofore with expensive automobile transmitting equipment and driveway receiving equipment, it has been necessary that the receiving equipment be very carefully situated to permit maximum proximity to the transmitter, and the driver of the automobile has been required to stop the car precisely at the marked location of the receiving unit in order to signal the automatic door operator effectively.

Moreover, prior magnetic door operator systems have required such close proximity of transmitter coil or magnet and the receiver unit such as a shiftably supported armature, that the transmitter element has been required to be suspended beneath the vehicle with very slight ground clearance, and as a consequence, such units have been brushed off the vehicle during travel over rough roadways. Also, the requirement of close transmitter-receiver proximity rendered such systems quite vulnerable to winter conditions, a few inches of ice or snow in the driveway raising the vehicle height and the transmitter coil height to such an extent as to disrupt the remote control feature.

It is a major object of the present invention to provide an improved automatic control system suitable for use with modern garage doors, providing great economy and simplicity and reliability, with low initial cost, simple and non-critical installation of equipment in the garage, in the driveway and in the automobile, and of such character as to allow very great leeway as to the position laterally, longitudinally, and vertically of the automobile from which signals can be satisfactorily transmitted to operate the system.

In achieving this major object of the invention, it is a further object to provide automatic control features usable not only for operating garage doors but also for operating other movable devices or machinery, and to provide selective direct and remote control features of great simplicity and reliability for such purposes.

It is a further object of the present invention to provide a door control system which, while permitting ample leeway of vehicle position for effective signalling, is nonetheless reasonably selective as to the vehicle position so that only the intended door will be opened by an impulse transmitted from a vehicle.

Another object of the invention is to provide a door control system which, if desired, may be arranged for remote control operation from a vehicle without necessity of installation of any fixed equipment external of the garage as on or in the driveway.

These objects have been met by providing an electromagnetic pulse system involving a momentary-contact switch and large-perimeter conductor-loop in the automobile and a very large-perimeter pickup conductor loop buried just beneath the driveway, with a compact, lightweight assembly of an electron discharge tube and relay control circuit and small motor—of the order of $1/20$ horsepower—attached to one of the two parallel tracks of a sectional overhead garage door, the motor assembly including speed reduction gears and being coupled through a simple V-belt arrangement to the counter-spring shaft of the door. A cam on the door cooperates with a switch actuator included in the track-mounting assembly to provide both upper limit switch action and drive reversing action, and the door drive mechanism is stopped in its downward travel simply by the sustained resistance offered it when the door comes in contact with the garage floor. The motor circuits are so arranged as to have the motor start in "reverse"—its direction for driving the sectional door downward to close the garage—when the door cam holds the actuator in the motor-reversal position, and thereafter, the motor having accelerated and opened the speed-responsive switch in series with the directional starting coil, it continues to drive in this direction until the descent of the door is stopped by the floor or by some temporary obstruction thereabove. The next signal impulse is made to set the drive motor in operation again, but the cam being now out of contact with the actuator, the motor is started in its "normal" direction, so that it raises the door to the full open position at which the cam again actuates the upper limit and reversing switch system.

While a pick-up conductor loop buried just beneath the driveway surface and a cooperating horizontal coil or loop on the car offer advantages of appreciable leeway of the position of the car and strong signal actuation, the system may if desired be provided instead with a pick-up loop around the framing of the garage door, and the vehicle transmitter coil or loop may comprise a vertical-plane coil, e. g. a few turns of wire encircling the radiator at the front of an automobile.

With either the vertical arrangement of the transmitter and pick-up loops or the horizontal arrangement of them, adequate lateral selectivity is provided so that even with two operator-equipped garage doors placed side by side, a transmitter of vehicle standing or moving before one door will actuate only that door. Thus, where a multi-car garage has two adjacent overhead doors with separate operator units, a vehicle normally signals only the door directly ahead of it.

The above and further features of the present invention will now be explained more fully with reference to the drawings, wherein, Fig. 1 is a general view of the garage door operating system including the automobile transmitting installation, the buried-wire receiving installation, and the track-mounted door operator, portions of the automobile and the garage being broken away to expose the operator system to view;

Figs. 2, 3 and 4 are sectional views of the specially constructed momentary pulse transmitter switch;

Fig. 5 is an oblique close-up view of the sectional overhead garage door and track-mounted operating mechanism as viewed from within the garage;

Fig. 6 is a fragmentary plan view of the garage door system with the door in the fully open position, the cam being in engagement with the limit and reverse switch actuator;

Figs. 7 and 8 are close-up views of the track-mounted assembly and the door counter-spring shaft, showing the mounting and belt coupling details;

Fig. 9 is the circuit diagram of the door operator system according to the present invention; and Fig. 10 is a diagrammatic illustration of optional vertical-plane installations of the transmitter coil and pick-up loop.

The same reference numerals are used throughout the drawings to designate corresponding parts thereof.

Referring now to Fig. 1, an automobile 11 is represented on the driveway approach to the garage 13. Garage 13 is provided with an overhead door 15 of the sectional type. The hinge-joint-connected sections of this door are guided along parallel tracks 17 and 19. To the latter of these tracks is attached the door operator assembly 21 including the motor and the control circuits therefor.

A relatively extensive loop of wire 23 is placed on the ground or buried at a shallow depth, in a position for inductive coupling from a transmitter loop 25 provided in the automobile. The receiving loop 23 is susceptible of wide variations as to its length, width, and number of turns, depending upon the range of automobile transmitter positions from which it is desired to have it operable. As illustrated, the loop may have a width slightly exceeding the paved or gravelled trackway width usually provided in the garage approach, a width of ten to twelve feet being ample. The length of the receiving loop may be of the order of twenty to forty feet, as desired, a length of 20 feet being practical for most cases.

If desired, the receiving loop may include a portion extending within the garage floor area and a substantial portion in the garage approach area, so that the automobile transmitter may be used to operate the mechanism not only from the garage approach position but also from the position of the car housed therein. With the great longitudinal as well as lateral extent of the receiving loop, ample latitude is afforded as to the position of the automobile for effective signalling and, moreover, the signalling can be accomplished reliably while the car is in motion, as when it is being driven out to the street.

The automobile transmitter system comprises merely a momentary-contact switch 27 and fuse 29 inserted in series with the transmitter loop 25 across the automobile ignition battery 31. The special arrangement of the elements of switch 27 for insuring that the current pulse through the transmitter loop 25 will be of very high-intensity and of extremely short duration is illustrated fully in Figs. 2, 3 and 4.

The contactor portions of the switch 27 are housed in a moulded dielectric housing having a body portion 33 and a dielectric cover plate 35. The switch is mounted by a formed and threaded metal ferrule 37 to the automobile instrument panel 39. A toggle arm 41 is pivotally suspended in the ferrule 37, and provided with a ball-formed lower end 43 nested in a concavity in a cap 45 on a compressed helical spring 47. At its lower end, the spring 47 is seated on a conformal upper portion of a formed link part 49 having a downwardly extending toe 51 engaging a dielectric slider 53 in a rectangular slot 55 provided therein.

Four stationary contactor parts are provided in body portion 33, two being positioned in each end thereof. These contactor parts each include left portions extending downwardly to the bottom of the chamber formed in body portion 33, and then extending longitudinally therealong to terminate in slightly raised portions near the middle area thereof. With this arrangement, the raised ends of contactor parts 61 and 63 are spaced apart by a short gap, and similarly the ends of contactor parts 65 and 67 are spaced apart by an equal gap on the other side of the switch.

Two parallel contactor blades 71 and 73 are provided on slider 53, these blades having middle parts lying along the upper surface of the slider 53 and having their ends passed through conformal slots therein and bent along the bottom surface of the slider 53. Arranged in this way, the slider 53 carrying the movable contactor blades 71 and 73 must be moved to a position of symmetry about the cross-sectional mid-plane of the switch on which the view of Fig. 3 is taken, in order for the ends of the contactor blades 71 and 73 to bridge the circuits between contactor parts 61 and 63 and contactor parts 65 and 67, respectively. In all other positions of the movable switch sub-assembly 53, 71, 73, the circuits between contactor parts 61 and 63 and between contactor parts 65 and 67 are open.

Contactor parts 61 and 65 are connected in shunt, and parts 63 and 67 are similarly connected in shunt, so that the overall arrangement is equivalent to a single-throw, single-pole momentary contact switch of appreciable current capacity.

The arrangement of parts 41, 43, 45, 47, 49 and 53 is such as to provide for high-speed travel of the slider sub-assembly 53, 71, 73 from the left-hand position of rest as viewed in Figs. 2 and 4, through the mid-position to the right-hand position of rest, and similarly in the opposite direction. However gradually the user may move the toggle-lever 41 to the right as viewed in Fig. 2, the forces exerted on the slider 53 by the spring coupling system act to the left thereon until the toggle 41 has passed just beyond the vertical and commenced to lean slightly to the right as seen in this view. Then, the spring 47 having just passed through its greatest compressional deflection, it abruptly exerts a great force tending to carry the toggle arm 41 on through the remainder of its arc of travel and, more vital to the proper functioning of the switch, it exerts a great force on the slider 53 to the rightward as seen in these views, shifting it to the right-hand limit of its travel with great speed.

With the slider in this position, arrested by coming against the dielectric shoulder 75 at the right, and hence in a position symmetrically opposite its position as seen in Figs. 2 and 4 of rest against the left-hand shoulder 77, the ends of the contactor blades 71 and 73 are out of contact with the ends of the four fixed contactor parts, with displacements therefrom equal but opposite to those apparent in Fig. 2. Thus, with each throw of the arm 41 from one extreme of its travel through the position of unstable equilibrium to the opposite extreme, the switch 27 is made to provide very brief circuit continuity between the ends of the switch, and hence to provide the required very short pulse of current sufficient for the control of the circuits in assembly 21.

The physical arrangement of the motor and control circuit assembly 21 on one of the door tracks 19, and the coupling of the motor to the overhead door mechanism, are more fully illustrated in Figs. 5, 6, 7 and 8. The motor 81 includes a speed reduction gear system within its housing, and has a transverse output shaft on which is mounted a V-belt pulley 83. The motor 81 is fastened to a base plate 85 which forms part of a compact rectangular frame 87 including upright members 89 and 91 bolted to the horizontal portion of track 19. At least one of these members 89, 91 is made very broad for great rigidity.

The motor pulley 83 is coupled by a V-belt 93 to a pulley 95 added to the end of the counter-spring shaft 97 which is included as an integral part of the standard sectional overhead door system. This shaft 97 is coupled at its ends by suspension cables to the respective lower corners of the sectional door, and a coil spring 99 is provided on the shaft, connected at one end to the shaft 97 and fixedly anchored at the opposite end, and tensioned in such a way as to offset nearly all of the weight of such sections of the door as are vertically suspended, thus reducing the effort required to lift the door, and insuring against overly rapid descent of the door when manually operated. With the coupling of the motor output shaft to the counterspring shaft, therefore, the motor is enabled through its rotation in one direction to lift the door to open the garage, and through rotation in the opposite direction to lower the door and close the garage. In the latter direction, the motor action is such as to work with the gravitational force tending to close the door, and against the counterspring, to wind the spring tighter and permit the door to descend.

A belt tensioning arrangement including an idler pulley 96 on a pivoted pulley arm 94, with a tensioning spring 98, is provided for retaining the desired tension in the V-bolt, and for resisting rebound of the garage door from the closed position and for guarding against opening of the garage door by meddlers. With reference to "lock-down" action here, the door is of course not actually clamped down in closed position, as the counterspring shaft is only unilaterally coupled to the sectional door unit. However, the action of the tensioning and lock-down arrangement is such as to hold the counter-spring shaft locked in the position reached by it when the door fully closed, so that any meddler's attempt to raise the door would require lifting the full and uncompensated weight of the door, a weight of several hundred pounds.

The pulse receiver and electronic control circuit for the motor 81 are included within a compact metal housing 101 included in the assembly 21. This housing is provided with a switch actuator 103 extending angularly outward from the vertical cover face, and arranged to be deflected inwardly by a cam 105 formed of angle stock and mounted on the side board of a suitable section of the door, on the inner surface thereof. This cam 105 is mounted at a convenient angle for smooth engagement with the actuator 103, and for holding this actuator appreciably deflected through a few inches travel of the door from the fully open position in which it is illustrated in Fig. 6.

The circuit diagram of the complete door control system including the automobile transmitter and the garage and driveway equipment is shown in Fig. 9. Switch 160 is a triple-pole, double-throw switch, all sections of which are controlled by the actuator 103. The arms of this switch normally remain in the downward position in which they are illustrated in Fig. 9, being deflected to the upper contact positions only when the garage door is within a few inches of its maximum upward travel, where the cam 105 deflects the actuator 103.

Coils 113 and 115 are the main coil and the direction-determining starting coil, respectively, of the motor 81, and switch 117 is the centrifugal cut-out switch included within the motor 81 for opening the auxiliary coil circuit as the rotor speed increases. Whereas an alternating current motor of the split-phase type or other type including an internal centrifugal cutout switch for its auxiliary direction-determining starting coil usually is not provided with an external-connection terminal connected intermediate the auxiliary coil and the centrifugal switch, the motor of this invention is provided with a terminal 119 so connected, so that the centrifugal switch 117 can be made to serve an important control purpose in addition to its normal function within the motor 81, as will appear more fully below.

The circuits for control of the motor 113, 115, 117 include a cold-cathode grid-controlled gaseous discharge tube 120 and a relay 130 having its control winding 131 connected in the anode circuit of the tube 120. The grid circuit of the gaseous discharge tube 120 is coupled to the receiving loop 23 through a voltage step-up transformer 140 having a primary winding 41 connected to the ends of loop 23 and having a secondary winding 142 of approximately 100 times as many turns as the primary 141. One end of the secondary winding is connected directly to the control grid 121 of tube 120, and the other end of the secondary winding 142 is coupled to the cathode 122 through a direct-current blocking capacitor 151.

The relay 130 normally is not energized. It is subject to initial actuation by flow of current through the anode circuit of tube 120. Relay 130 has an armature comprising two movable contactor arms 132 and 136, the former being shiftable from a position of rest in contact with stator element 131 to a position in contact with element 133, and the second arm 136 being similarly shiftable from a position of contact with element 135 to a position in contact with element 137.

The electric power both for operation of the control circuits and the motor is supplied over 115 volt, 60 cycle alternating current supply mains 153, 155, the latter being the grounded side of the supply. Supply conductor 153 is connected to one end of the main motor winding 113 and to terminals 162 and 166 of switch 160. The opposite end of the main winding 113 is connected to terminals 163, 165 and 168 of switch 160, and to element 133 of relay 130. The other supply conductor 155 is connected to arms 132 and 136 of the relay, to the cathode 122 of the tube, and to element 169 of the triple-pole double-throw switch 160. The auxiliary starting winding 115 and centrifugal switch 117 in series are connected between arms 161 and 164 of the switch 160.

A rectifier-filter circuit arrangement is provided for supplying direct high voltage to the anode and control grid of the tube 120. This circuit includes a resistor 157 and rectifier 159 connected in series between terminal 119 and a terminal 138 of the relay winding 131, and a capacitor 171 is connected between terminal 138 and contact element 135. When the door is down (closed) and the circuits are at rest, uni-directional (rectified) currents flow from conductor 153, through the motor coils to terminal 119, thence through resistor 157 and rectifier 159 (the current direction-determining element), holding the left-hand terminal of capacitor 171 and relay winding terminal 138 charged to a potential of the order of 150 volts positive with respect to the grounded supply conductor 155.

A resistor 172 and rectifier 174 are connected in series between conductor 155 and element 135 of the relay.

A potentiometer 173 is connected between terminal 138 and supply conductor 155, and its slider tap 175 is coupled to the lower terminal of secondary winding 142 through a series resistor 177. Arm 175 is adjusted to a position at which the grid 121 is biased at such a positive potential with respect to the cathode 122 as to keep the tube 120 just below the "firing" point by a sufficient margin so that line voltage fluctuations cannot cause the gaseous discharge tube to fire and cause an operation of the motor. The arm 175 normally is set for a potential of the order of 40 to 60 volts positive with respect to the cathode.

Now, assuming that the switch 27 in the automobile on the driveway is operated, a high-intensity current pulse of very short duration is sent through the transmitter coil 25, in the manner outlined above. Through the inductive coupling between coils 25 and 23, a transient voltage wave is induced in the latter, and a stepped-up voltage wave is produced in the secondary winding 142 of the transformer 140. The potential difference of grid 121 over the potential of cathode 122 is thereby momentarily increased materially over that normally maintained at the slider 175 of potentiometer 173, causing "firing" or plasma breakdown in the tube 120, with a low-resistance ion plasma conduction path between the anode 123 and the cathode 122. Appreciable current is made to flow through the winding 131 of the relay 130, causing transfer of arms 132 and 136 into contact with elements 133 and 137, respectively.

Through relay arm 132 and element 133, terminal 165 is brought to the potential of conductor 155, the full supply voltage being applied to the main motor winding 133. Also, the auxiliary winding 115 is supplied through switch arms 161 and 164 in contact with terminals 162 and 165, the current through winding 115 and switch 117 being in the relation to the current through the main winding 113 for causing the motor to raise the door.

Through relay arm 136, the upper terminal of the relay coil is connected to the conductor 155, and the current for retaining the coil 131 energized is now supplied by the discharging capacitor 171 through resistor 172 and rectifier 174. The total resistance of winding 131, resistor 172 and rectifier 174 is such that the capacitor 171 discharges at such a rate as to be able to sustain arms 132 and 136 of the relay attracted to their positions in contact with elements 133 and 137 for a predetermined short time, e. g. 1.5 seconds.

Before the expiration of this time, however, the motor normally has accelerated beyond the speed at which switch 117 automatically is opened, so that the potential of junction 119 is changed from that of supply conductor 155 to a potential substantially equal to that of conductor 153. Henceforth, the energization of relay 130 is sustained by unidirectional current pulses through the half-wave rectifier circuit including coil 115, resistor 157, and rectifier 159, the circuit from conductor 153 to conductor 155 being traced onward through coil 131 and elements 137 and 136 of the relay. Resistor 176 connected in shunt with the coil of the relay prevents relay chattering.

Thus, relay 130 is retained energized through a self-holding circuit involving the continued downward attraction of arm 136 in contact with element 137, and dependent upon speed-responsive switch 117 remaining open. When the door approaches within a few inches of the fully opened condition, the cam 105 engages switch actuator 103, transferring arms 161, 164 and 167 of switch 160 over to the opposite throw positions in contact with terminals 163, 166 and 169, respectively. As a consequence, the supply circuit of resistor 157 and rectifier 159 from conductor 153 is interrupted, so that relay 130 is de-energized and arms 132 and 136 are returned to their positions of rest as shown in Fig. 9. The motor supply circuit is broken by the return of relay arm 132 to its normal position, so that the door drive arrangement is stopped and the system now rests with the proper direct voltages applied to the anode and grid circuits of the tube 120 to make it susceptible to a further signal pulse. From this, it is apparent that switch 160 operated through actuator 103 serves not only for reversing the motor direction to drive the door downward, but also for stopping the upward drive of the door, thus acting as an upper limit switch.

Now, assuming the automobile to have been driven into the garage, a further pulse is supplied for again causing the tube 120 to "fire," and thereby again instituting operation of the door drive system. If the receiving loop 23 extends within the garage floor, this further pulse may be signalled through a further manipulation of the switch arm. Otherwise, it may be signalled through a push-button and bell ringing transformer arrangement 181, 183 wherein the primary winding 185 of transformer 183 is supplied from the 115-volt mains through elements 131, 132 of the relay 130, and the secondary circuit including series-connected push-button switch 191 is connected across the primary winding 141 of transformer 140. This arrangement is usable for raising or lowering the garage door, directly instituting conduction through tube 120 and the ensuing circuit functions in the same way as in response to the induction transient in coil 23 produced by the automobile transmitter.

The arms 161, 164 and 167 of switch 160 being retained in contact with terminals 163, 166 and 169 by cam 105 while the door is open, the direct potential supply circuit for capacitor 171, potentiometer 173 and tube 120 is traceable from supply conductor 153 through terminal 166 and arm 164 of switch 160, and through motor switch 117 to the series connected resistor-rectifier circuit 157, 159.

Moreover, due to the cross connections between terminals 162 and 166 and between terminals 165 and 163, the coils 115 and 113 of the motor are energized in the opposite phase relation when a circuit is again established for the energization of relay 130 through the ion-plasma discharge in tube 120, and accordingly, the motor operation is initiated in the opposite direction, for lowering the garage door. As the door is started downward, and just before cam 105 clears actuator 103, switch 117 opens. The ensuing successive conditions of operation in the circuit take place as in the case of raising the garage door, the firing of the tube 120 having first energized the relay, the capacitor 171 having then discharged through resistor 172 and rectifier 174 to sustain the relay energization for a short period during which arms 161, 164 and 167 return to their downward positions, and the centrifugal switch 117 having opened meanwhile as the result of the motor acceleration and provided for sustained energization of the coil throughout the period of movement of the garage door with unidirectional current pulses flowing from conductor 153 through parts 162 and 161 of switch 160, through coil 115, resistor 157 and rectifier 159.

The arrest of the downward movement of the garage door operating system is accomplished without reliance upon any ordinary lower limit switch, through dependence upon the speed responsiveness of the centrifugal switch 117. When the garage door comes in contact with the garage floor apron, it is forcibly stopped, momentarily stalling the motor. It will be noted that the arrest of downward movement of the door leaves the motor to work unaided against the full force exerted by the spring, and this far exceeds the motor's torque capacity. Hence, when the descent of the door is stopped, the motor is stalled. The centrifugal switch 117 therefore recloses, bringing terminal 119 to the potential of supply conductor 155, so that no voltage difference is provided across rectifier 159 and coil 131 and the armature switch arms 132 and 136 are released, ending the holding circuit condition in the relay.

It is an important feature of this invention that the motor drive system is stopped in this manner when the door comes in contact with any substantial obstruction. Thus, if appreciable packed snow or ice has accumulated on the garage floor apron, preventing the door from descending to its usual fully closed stopping position, the door drive system is none the less turned off to hold the door closed down to the ice. Even a child's express wagon or a man's shoulder beneath the descending door has the same effect, and the use of the centrifugal switch 117 for lower-limit shut-off purposes not only results in appreciable economy but also in an important combination of safety and adaptability to the need for different stopping levels for the door according to the adverse weather conditions.

It will be seen that the arms 161, 164 and 167 of switch 160 are thrown to their upper position as indicated in Fig. 9 only when the door is within a few inches of its maximum upward (and inward overhead) travel, and accordingly, the downward door travel direction is determined for the motor operation only when the door is started from the fully opened position. Hence, after the door has been stopped at any level therebelow, whether by an obstruction or by the garage floor apron, the next-instituted operation of the door drive mechanism is in the direction to lift the door and open the garage.

The features achieved through this reliance on the centrifugal switch 117 for automatic shut-off purposes in addition to its regular function in the motor 81 are not limited to stopping the downward drive. It occasionally happens that in severe cold weather conditions, the garage door becomes frozen to the door trim or to the garage floor apron. Under such conditions, when a signal is given to institute operation of the motor 81 to raise the door, the tube 120 is fired and relay 130 is actuated, and it thereupon is held closed during the capacitor-discharge period of the order of 1½ seconds by the current flowing from the storage capacitor 171. In view of the inability of the motor 81 to turn, however, centrifugal switch 117 remains closed, so that when capacitor 171 has discharged to a voltage insufficient to retain the armature parts 132, 136 of relay 130 attracted to the position of contact with elements 131 and 135, the armature is released and the circuits are all returned to the quiescent conditions. Thus, the switch 117 in this connection serves as a safety cut-out switch protecting the rotor 81 from being overheated by prolonged energization thereof.

It has been observed that tubes of the cold-cathode gaseous discharge type such as tube 120 vary in their operating characteristics, particularly in their electrode voltages for "breakdown" or the commencement of plasma conduction, according to the ambient light conditions in the region of the cathode. This photosensitivity is put to use by the provision of a miniature neon bulb 193 connected in series with a current-limiting resistor 195 across the primary 185 of the bell-type transformer 183, the bulb being placed adjacent the glass envelope of tube 120 to provide illumination of the electrodes therein.

A 115-volt filamentary lamp 197 such as an ordinary 60-watt frosted lamp may be connected between switch arm 167 and supply conductor 153. This lamp serves not only for illumination of the garage while the door is being raised or lowered, but also for system performance monitoring.

In the foregoing description of the invention, the speed responsive switching means has been referred to as a centrifugal switch built into the electric motor and forming an integral part thereof. It will be readily appreciated, however, that this switching means need not necessarily be within the motor, but may be arranged external thereof, and further, it will be apparent that it may take other forms than that of a centrifugal mechanism, e. g., that it may comprise a relay operated by the back-electromotive force generated in one of the motor coil circuits.

It is an important feature, nonetheless, that a single speed responsive switching means e. g., an internal centrifugal switch is made to serve the dual functions in this invention of appropriate change of the motor circuits as the motor accelerates and of setting up the pulsating current relay sustaining circuit prior to discharge of the capacitor and interrupting this pulsating current circuit upon motor stall.

As many changes could be made in the above construction and many widely different embodiments of this invention could be made without departing from the scope thereof, it is intended that all the matter contained in the above description and shown in the accompanying drawings shall be interpreted as illustrative and not in a limiting sense.

What is claimed is:

1. A garage door opening system for control from a nearby motor vehicle, comprising: a motor having a directional starting coil and a running coil and a speed-responsive switch in series with the starting coil, means for coupling said motor to the door for lifting or lowering the door according to the direction of motor operation, a vehicle transmitter including a coil and a switch connected to the vehicle ignition battery, the vehicle transmitter switch contactor being elastically limited to very short-duration contact with the cooperating contact element, a pick-up conductor loop fixedly positioned in the vicinity of the garage door for inductive coupling to the vehicle transmitter coil, a double-throw reversing switch connected to the reversing coil of said motor for reversing the starting direction thereof, a cold-cathode gaseous discharge tube having an anode and a control element or grid coupled to said pick-up loop, a relay having a coil connected in the anode-cathode circuit of said gaseous discharge tube, said relay having an armature coupled to the coils of said motor and to a holding circuit for sustaining the energization thereof, means including a rectifier and a capacitor for maintaining the electrodes of said tube at potentials just below the firing point, whereby a voltage pulse induced in said pick-up conductor loop by actuation of the vehicle transmitter switch is enabled to institute conduction through said tube and energization of said relay, means including circuit connections of said capacitor, and said armature and the coil of said relay for sustaining the energization of said relay independently of continued conduction through said tube until the charge of said capacitor has been substantially diminished, and means for supplanting the capacitor discharge current in retention of said relay energized by current directly through said rectifier upon the attainment of the operating speed of said speed-responsive switch.

2. A garage door operating system as defined in claim 1, further including means for throwing said double-throw switch to the opposite throw each time the movement of the door and the accompanying rotation of the motor is arrested.

3. A garage door opening system for selective control locally and remotely through signalling from a nearby motor vehicle, comprising: a motor having a directional starting coil and a running coil and a speed-responsive switch in series with the starting coil, means for coupling said motor to the door for lifting or lowering the door according to the direction of motor operation, a vehicle transmitter including a coil and a switch for connection to the vehicle ignition battery, the vehicle transmitter switch contactor being elastically constrained in open-circuit condition and being elastically limited to very short-duration contact with the cooperating contact element, a pick-up conductor loop fixedly positioned in the vicinity of the garage door for inductive coupling to the vehicle transmitter coil, a double-throw reversing switch connected to the reversing coil of said motor for reversing the starting direction thereof, means for actuating the reversing switch upon arrival of the door at the fully opened position thereof, and holding it actuated until the door has been started toward its reclosed position, a voltage step-down transformer having a primary winding for alternating-current supply energization, a cold-cathode gaseous discharge tube having an anode and also having a control element or grid coupled to said step-down transformer and to said pick-up loop, a relay having a coil connected in the anode-cathode circuit of said gaseous discharge tube, said relay having a contactor for energizing the coils of said motor and also a contactor for completing a self-holding circuit for said relay, a circuit connected to the latter contactor and to said speed-responsive switch for retaining the relay energized after it has been energized long enough to provide for acceleration of the motor to the extent that said speed-responsive switch is in open-circuit condition, and means for supplying to the anode and control element of said gaseous discharge tube direct voltages holding said tube just below its firing point, said gaseous discharge tube being ignitable alternatively by a voltage pulse induced in said pick-up loop by said vehicle transmitter or by a train of alternating voltage cycles signalled through said step-down transformer, for initiating energization of said relay and thereby starting said motor in the door opening direction if said double-throw switch is actuated, a sustained closed condition of said speed-responsive switch with said double-throw switch non-actuated being sufficient to insure premature termination of said holding circuit condition in the relay and thereby protect the motor, and said relay holding circuit being subject to interruption by reclosure of said speed-responsive switch and alternatively by actuation of said double-throw switch.

4. In combination: a sectional overhead door system including a pair of door tracks, one for each side of the door, and a counterspring and counterspring shaft coupled to the door; a door operator assembly including a motor and a motor control relay and relay control circuit, said assembly being rigidly suspended from one of said tracks; means including a speed reduction mechanism coupling said motor to said counterspring shaft; vehicle-borne means for originating an electromagnetic induction energy impulse, including a loop of wire and a toggle switch connected in series with the vehicle battery, said toggle switch being open-circuited in its rest positions and making momentary contact in its transition from one rest position to the other; and fixed electromagnetic induction impulse receiving means coupled to said relay control circuit; said control circuit including means for initial energization of said motor control relay upon reception of an electromagnetic induction impulse from said vehicle-borne means, and means for holding said motor control relay energized until the door is propelled to a limit of travel thereof.

5. A door operating system for opening and closing a movable door system, comprising an electric motor operatively coupled to the door system, an induction impulse receiving loop, a control circuit connected to said loop for energizing said motor upon reception of an induced transient current impulse in said receiving loop, and a vehicle-borne transmitter system for momentarily energizing said receiving loop by induction coupling, said transmitter system comprising a vehicle transmitter wire loop, and a battery and a momentary contact switch connected in series between the end terminals of said transmitter loop, said switch comprising a toggle switch including a slider element shiftable between first and second rest positions through an intermediate position of unstable equilibrium, said switch further including elastic means for accelerating said slider element during its progress through said intermediate position, said switch being in open-circuit condition at each position of rest and said slider element making the circuit through said switch momentarily during its passage through said intermediate position.

GEORGE F. RICHARDS.

REFERENCES CITED

The following references are of record in the file of this patent:

UNITED STATES PATENTS

| Number | Name | Date |
|---|---|---|
| 1,724,995 | Dautrick | Aug. 20, 1929 |
| 1,897,391 | Kelly | Feb. 14, 1933 |
| 1,916,651 | Beeman et al. | July 4, 1933 |
| 1,972,695 | Staude | Sept. 4, 1934 |
| 2,020,831 | Greegor | Nov. 12, 1935 |
| 2,023,909 | Wread | Dec. 10, 1935 |
| 2,189,019 | Rowe | Feb. 6, 1940 |
| 2,210,037 | Meuer | Aug. 6, 1940 |
| 2,247,247 | Meuer | June 24, 1941 |
| 2,335,336 | Zoller | Nov. 30, 1943 |
| 2,401,082 | Konter | May 28, 1946 |
| 2,424,385 | Cook | July 22, 1947 |
| 2,432,313 | Heumann | Dec. 9, 1947 |
| 2,533,116 | Jenkins | Dec. 5, 1950 |